Dec. 5, 1939.    D. H. CAMERON    2,181,867
AUTOMATIC RECORDER
Original Filed March 27, 1937    2 Sheets—Sheet 1
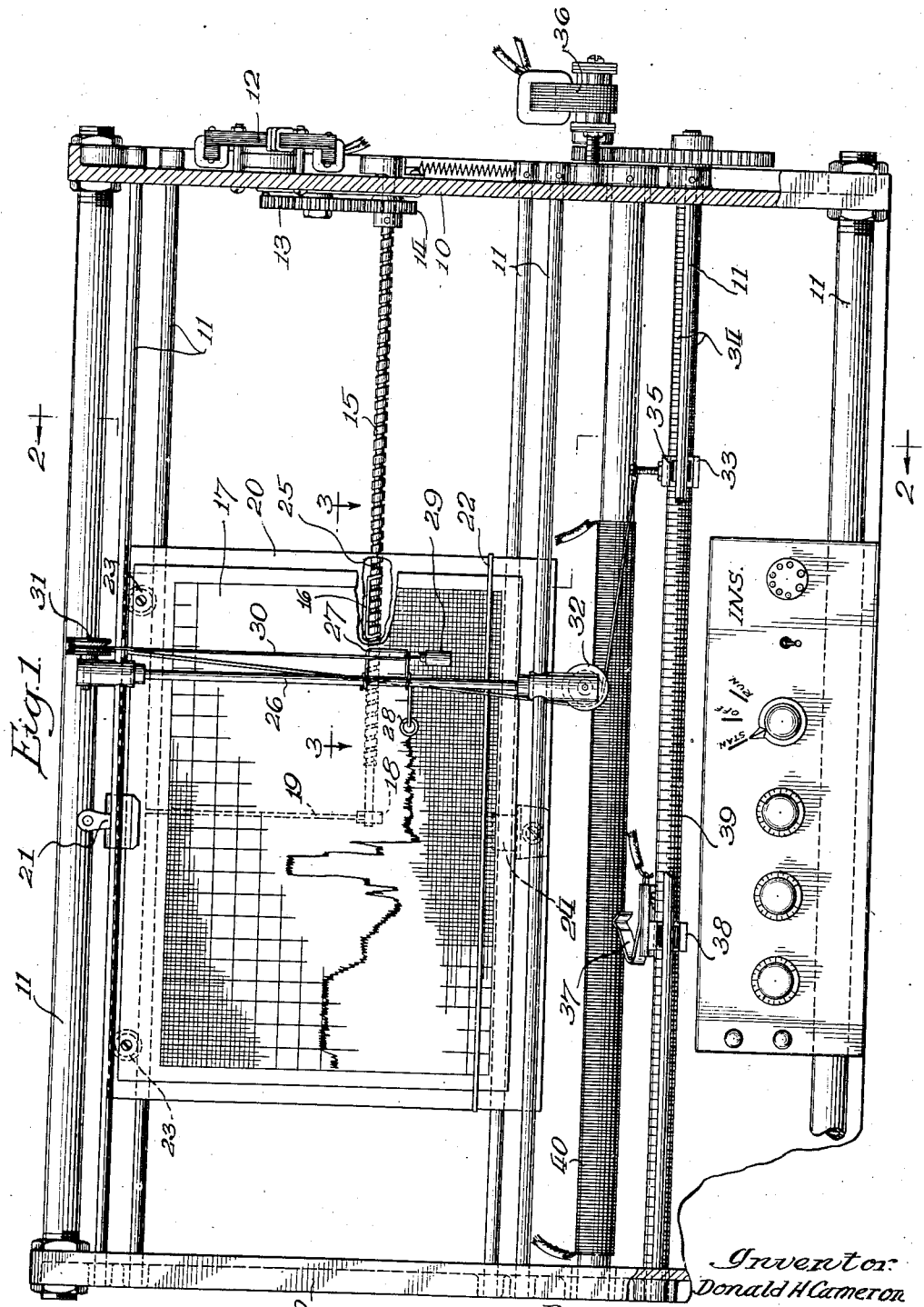
Inventor:
Donald H Cameron
By Williams, Bradbury, McCaleb & Hinkle
Attys.

Dec. 5, 1939.   D. H. CAMERON   2,181,867
AUTOMATIC RECORDER
Original Filed March 27, 1937   2 Sheets—Sheet 2
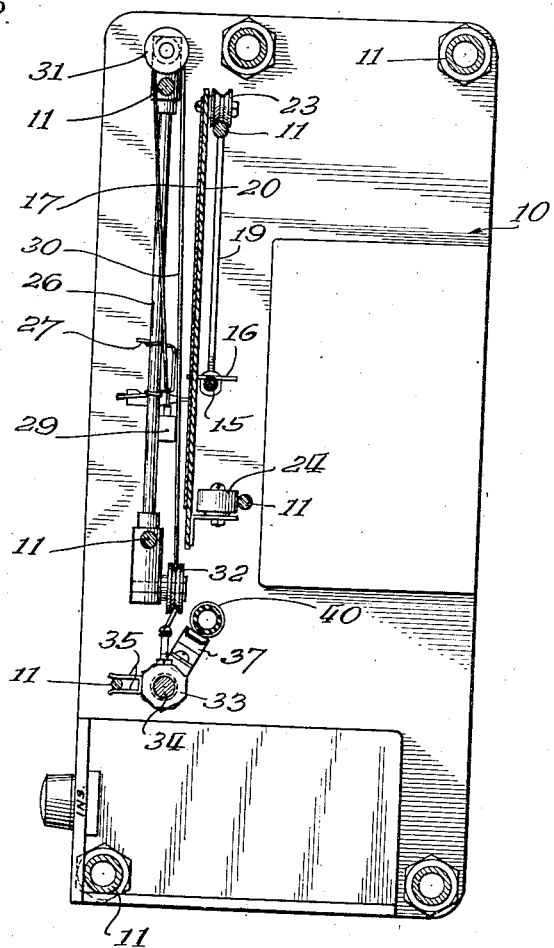
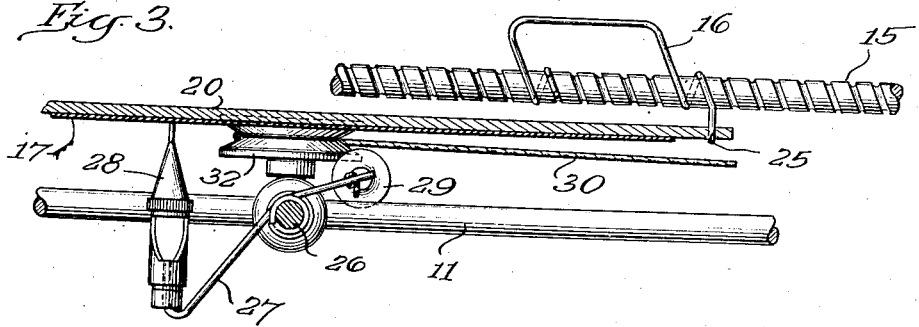
Inventor:
Donald H. Cameron
By Williams, Bradbury, McCabe & Hinkle
Attys.

Patented Dec. 5, 1939

2,181,867

UNITED STATES PATENT OFFICE 2,181,867

AUTOMATIC RECORDER

Donald H. Cameron, Racine, Wis., assignor to B. D. Eisendrath Tanning Co., Chicago, Ill., a corporation of Illinois Original application March 27, 1937, Serial No. 133,333. Divided and this application January 7, 1938, Serial No. 183,908

3 Claims. (Cl. 234—71)

This application is a division from my copending application Serial No. 133,333 filed March 27, 1937.

This invention relates to automatic recorders, and more particularly to the mechanism which makes a record on a chart.

One of the principal objects of the invention is to provide an improved support and means for actuating a pen or pencil for the purpose of making an automatic record.

Other objects of the invention will appear from the following description of a preferred embodiment thereof, taken in conjunction with the accompanying drawings, in which:

Figure 1 is a front elevation of a recorder embodying my invention, parts of the recorder being shown in section for the sake of better illustration.

Fig. 2 is a sectional elevation through my recorder, taken on the line 2—2 of Fig. 1, and Fig. 3 is a sectional plan detail view, taken on the line 3—3 of Fig. 1.

Referring to the drawings, the part of the recorder illustrated therein comprises a suitable cabinet which may include end frames 10 secured together by bars 11. On one of the end frames 10 a synchronous clock motor 12 is mounted. This motor is connected by means of gears 13 and 14 to a screw 15. The motor 12 is driven at a constant speed from the power lines and the screw 15 is fed and rotated at a definite speed, depending upon the units employed. Thus, it may advance a chart by means of a non-rotating nut element 16 at the rate of 1" per hour, ½" per hour, or one centimeter per hour, depending upon the scale of the chart 17 employed. To adapt the device for different rates of feed, the gears 13 and 14 may be replaced or a screw 15 of different pitch may be employed.

One end of the screw 15 has a bearing in one of the frames 10, and the other end has a bearing 18 supported by a depending rod 19 from one of the rods 11. The chart 17 is mounted on a plate 20 which is somewhat larger than the chart and it may be secured thereto in any suitable manner, for example, by means of a clip 21 and a rubber band 22. The plate 20 is mounted for easy movement in a horizontal direction. Thus, it may carry rollers 23 near its upper edge which ride on one of the bars 11 to support the plate. It may also carry a roller 24 near the lower end which rides upon another of the bars 11. The plate 20 may have an opening 25 through which extends a portion of the nut member 16 which rides on the screw 15. The nut member 16 may suitably consist of a stout wire formed with convolutions corresponding to the thread of the screw 15.

A vertical rod 26 is mounted on two of the rods 11 about half way between the two frames 10. A pen carriage 27, which may suitably be a piece of wire bent to provide two loops around the rod 26, is freely slidable upon the rod 26. An end of the wire carriage extends to one side of the rod 26 and carries a pen 28, or other suitable marking device. A portion of the carriage 27 extends to the other side of the rod 26. A weight 29 is mounted on this portion and the cord 30, which may suitably be a silk fishing line, is attached thereto.

The cord 30 extends upwardly and slightly forwardly to a pulley 31 at the upper end of the rod 26. The cord passes over the pulley 31 and extends downwardly to a pulley 32 from which it extends substantially horizontally to the nut 33 to which it is secured. It may here be remarked that the nut 33 is located in definite zones along a screw 34 in accordance with the physical quality or phenomenon being measured.

The nut 33 is held against rotation by means of a forked member 35 which engages one of the rods 11. Consequently, when the screw 34 is rotated by a motor 36, the position of the nut 33 on the screw 34 is varied and, consequently, the altitude of the pen carriage 27 on the chart is also varied. In the device of the aforesaid application Serial No. 133,333, the motor 36 automatically operates until a contact 37, which is propelled by a nut 38 mounted on a screw 39, reaches a certain point on the potentiometer 40 which corresponds to a certain pH value which is to be recorded. The screw 39 is integral with the screw 34. It is to be understood, however, that the invention is not to be limited to the device of the aforesaid application or to the recording of pH, because it can be applied to the recording of all kinds of recordable data.

The weight 29, in conjunction with the forward obliquity of the length of the cord 30, as best seen in Fig. 2, which supports it, results in the pen 28 being yieldingly held against the chart 17. Consequently, when the nut moves to the right, as viewed in Fig. 1, the pen 28 rises on the chart 17, and when it moves to the left the pen 28 descends on the chart 17 owing to its weight and the weight 29. At all times the weight 29 provides a component which tends to rotate the pen carriage so that the pen is always maintained against the chart 17 with a certain definite pressure.

The chart moves from right to left under the action of the clock motor 12 and, consequently, the physical changes which are to be recorded and which are applied by movements of the nut 33 and cord 30 are graphically shown on the chart 17 for the intended space of time. At the end of that space of time the plate 20 may be swung forwardly slightly to disengage it from the nut member 16 and the plate 20 may then be lifted out of the machine and the chart 17 may be removed. The nut member 16 may then be moved to the right along the screw 15, a new chart is applied to the plate 20, and the plate 20 is again installed with a portion of the nut member 16 extending through its opening 25. The chart may be accurately positioned on the plate 20 so that the initial contact of the pen with the chart may correspond to the time then prevailing.

Although the invention has been disclosed in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. In a recording instrument, in combination, a chart supporting member, a carriage, means supporting said carriage for free sliding and swinging movement, means for moving said chart supporting member in a direction transverse to the direction of the sliding movement, a recording element mounted on said carriage, and a cord for actuating said carriage, said cord extending at an inclination to the direction of sliding movement of the carriage to force said recording element towards the chart supporting member.

2. In a recording instrument, in combination, a chart supporting member, means for moving the chart supporting member, a carriage, means supporting said carriage for free sliding vertical movement transverse to the direction of movement of the chart supporting member and for swinging horizontal movement, a pen mounted on said carriage, and a cord attached to said carriage for actuating it, said cord extending upwardly at an inclination to the vertical to force said pen towards the chart supporting member.

3. In a recording instrument, in combination, a chart supporting member, means for moving the chart supporting member in a horizontal direction, a carriage, means supporting said carriage for free sliding vertical movement and for swinging horizontal movement, a pen mounted on said carriage on one side of the supporting means, and a cord and weight attached to said carriage on the other side of said supporting means, said cord extending upwardly and away from the chart supporting member to force said pen towards the chart supporting member.

DONALD H. CAMERON.